United States Patent [19]

Nurse, Jr.

[11] Patent Number: 5,795,472
[45] Date of Patent: Aug. 18, 1998

[54] MULTISTAGE FILTER DEVICE INCLUDING A HOUSING WITH REMOVABLE SIDEWALLS HAVING A FILTERING CAPACITY

[76] Inventor: Harry L. Nurse, Jr., 10409 Watterson Trail, Louisville, Ky. 40299

[21] Appl. No.: 753,112

[22] Filed: Nov. 20, 1996

Related U.S. Application Data

[63] Continuation-in-part of Ser. No. 436,105, May 8, 1995, Pat. No. 5,591,331.

[51] Int. Cl.⁶ .................................................. B01D 29/35
[52] U.S. Cl. .................. 210/232; 210/323.1; 210/323.2; 210/346; 210/357; 210/442; 210/451; 210/457; 210/486; 210/495
[58] Field of Search .............................. 210/232, 234, 210/238, 239, 314, 316, 323.2, 346, 357, 435, 437, 441, 442, 446, 448, 451, 457, 485, 497.01, 499, 486, 495, 532.1, 532.2

[56] References Cited

U.S. PATENT DOCUMENTS

| | | |
|---|---|---|
| 2,900,084 | 8/1959 | Zabel . |
| 3,332,552 | 7/1967 | Zabel . |
| 4,040,901 | 8/1977 | Leisure .................. 210/323.1 |
| 4,439,323 | 3/1984 | Ball . |
| 4,710,295 | 12/1987 | Zabel . |
| 5,028,323 | 7/1991 | Gould ..................... 210/437 |
| 5,223,134 | 6/1993 | Riva ....................... 210/232 |
| 5,382,357 | 1/1995 | Nurse . |
| 5,409,606 | 4/1995 | Spencer ................. 210/232 |
| 5,413,706 | 5/1995 | Graves ................... 210/323.2 |
| 5,492,635 | 2/1996 | Ball ........................ 210/532.2 |
| 5,620,602 | 4/1997 | Stuth ...................... 210/532.2 |

*Primary Examiner*—W. L. Walker
*Attorney, Agent, or Firm*—Middleton & Reutlinger; Charles G. Lamb

[57] ABSTRACT

A filter device for separating solid material from a liquid includes a filter housing with vertically extending removable sidewalls wherein at the location of the removable sidewalls connections are provided to receive two vertically extending sidewalls in spaced parallel relationship whereby a fluid impermeable sidewall may be inserted into the circumferential section of the housing when the liquid permeable section is removed for cleaning without interfering with the continual operation of the filter device. Moreover, the filter device of the present invention may be a first filter or pre-filter in a multi-stage filter system wherein a second filtering device is received within the first filter, the second filtering device includes a plurality of first tubular filters having an open bottom end and a closed top end and a second tubular filter centrally disposed of the first tubular filters in flow communication therewith. The second tubular filter has a closed bottom end and an outlet top end in flow communication with a discharge from the filter system.

16 Claims, 9 Drawing Sheets

MULTISTAGE FILTER DEVICE INCLUDING A HOUSING WITH REMOVABLE SIDEWALLS HAVING A FILTERING CAPACITY

CROSS REFERENCE TO RELATED APPLICATIONS

This application is a continuation-in-part patent application of U.S. patent application Ser. No. 08/436,105 filed May 8, 1995, which is now U.S. Pat. No. 5,591,331.

BACKGROUND OF THE INVENTION

The present invention relates in general to filter devices and more particularly relates to an improvement in filter devices for waste water discharge systems.

There have been proposed and utilized a number of different filtering devices for separating solid matter from waste water in septic tanks. Most of the devices for removing waste water from septic tanks provide means for allowing the solid materials to settle to the bottom of the tank wherein the solid materials react with bacteria. The by-products of the reaction with the bacteria is then passed through a filtration means to remove the remaining relatively small solid particulates therefrom with the waste water being removed by overflow or by discharge pumps into a drain field. One particular device taught in U.S. Pat. No. 4,439,323 provides for a housing disposed within the upper portion of a septic tank wherein the housing is provided with apertures through vertical side walls at selected locations therealong and spaced interiorly of the walls is a fine mesh screen. The spacing between the walls of the housing and the screen is less than the diameter of the openings in the housing wall. Also disposed within the interior of the housing is a means to remove the filtered waste water from the housing by either a positive pressure pump or a siphoning device. However, whenever the screen becomes plugged in the filtration device it is necessary to open up the septic tank, remove the screen for cleaning and after cleaning, replace the screen in the housing. Thus, during the period of time the screen is removed for cleaning and replacing it is necessary for the filtration system to be out of operation.

SUMMARY OF THE INVENTION

An object of the present invention is to provide a filter device for separating solids from a liquid.

Another object of this invention is to provide a filter device for use in a waste water treatment device or septic tank.

Even another object of this invention is to provide a filter device having removable filter means within a housing which can be removed and cleaned during the filtration operation.

More particularly, the present invention provides a filter device for separating solid material from a liquid comprising:

A housing having an open top, a closed bottom and a plurality of vertically extending sidewall sections, at least one of the sidewall sections including a pair of removable vertically extending sidewall members being in spaced relationship, at least one of the removable vertically extending sidewalls have filtration means therein; and, means to remove liquid from the housing.

Even more particularly, the present invention provides a two-stage filter system for separating solid material from a liquid comprising:

a first filter device comprising an outer housing having an open top, a closed bottom and a plurality of vertically extending sidewall sections, at least one of the sidewall sections including a pair of spaced removable vertically extending sidewall members, at least one of the removable vertically extending sidewalls including filter means to retain solids of pre-selected size from a liquid to be filtered; and, an inwardly extending circumferential flange extending around an innersurface of said outer housing at a pre-selected distance above said filter means, said flange and said closed bottom defining a pre-filtered liquid inlet chamber;

a second filter device comprising a vertically extending inner housing having a horizontally extending bottom plate member in a lower portion thereof and received in sealing relation by said inwardly extending circumferential flange, said bottom plate member having a plurality of openings therethrough in flow-through communication with said pre-filtered liquid inlet chamber, a horizontally extending top plate member in an upper portion thereof with a centrally disposed opening of pre-selected size therein, said inner housing having a top outlet disposed vertically above said top plate member and in flow communication with the centrally disposed opening, a plurality of first vertically extending filter tubes having an opening in a bottom end of each of the first filter tubes, each bottom end being in flow communication with an opening in said bottom plate member, and, a second vertically extending filter tube centrally disposed within the inner housing and spaced from the first filter tubes, the second filter tube extending at least to said centrally disposed opening, said second filter tube having an open top and a closed bottom; and, means to remove liquid from said inner housing in flow-through communication with said second filter tube open top.

Briefly, the present invention provides a filter device useful in continuous separation of solid matter from a liquid, such as waste water, wherein the filter device is disposed within an aerobic or anaerobic waste water treatment device or septic tank. The location of the filter device is disposed generally within a middle portion of the septic tank which contains a relatively clear liquid level of the waste water. In the operation of a septic tank, most of the solids, or particularly the large, heavier solid materials, settle to the bottom of the tank with the upper portion of the liquid containing only small or light weight solid particulates which are left in the waste water. Between the upper portion and lower portion is a relative clear intermediate middle portion. In this relatively clear intermediate portion of the liquid in the tank the filter device is positioned. The housing for the filter device includes a plurality of sidewall sections circumferentially positioned vertically around the housing, at least some of the sections including filtration means therethrough. These filtration sections are individually removable but prior to removing, means are provided in the walls of the housing for the insertion of a spaced vertically extending member, preferably a blind or liquid impervious section which is inserted to blind off a vertical section of the housing where a vertically removable filtration section is to be removed. The removed filtration section can then be cleaned and reinserted back into the housing without shutting down the operation of the filtration device. It is also realized that another filtration section may be used instead of a blind.

Moreover, in another embodiment of the present invention, a second filter means is received within the aforedescribed filter device wherein the aforedescribed filter device is a first stage filter apparatus or pre-filter and the second filter means is received within the first filter apparatus. The second filter means includes a plurality of first filter tubes extending vertically through the housing wherein the first filter tubes are provided with openings in their bottom ends to receive pre-filtered liquid and circumferentially arrayed openings spaced therearound for the upwardly flowing fluids to exit therefrom. A centrally disposed second filter tube is provided wherein the second filtering tube has a closed bottom and circumferentially arrayed openings therein to receive the liquid passing out through the openings in the first filter tubes. The second vertically extending filter tube is in flow communication with means to remove liquid from the second filter means.

Further objects and advantages of this invention will appear to those skilled in the art from the following description and appended claims. reference being had to the accompanying drawings forming a part of the specification wherein like reference characters designate corresponding parts into several views.

DETAILED DESCRIPTION OF THE PREFERRED EMBODIMENTS

Figure 1:
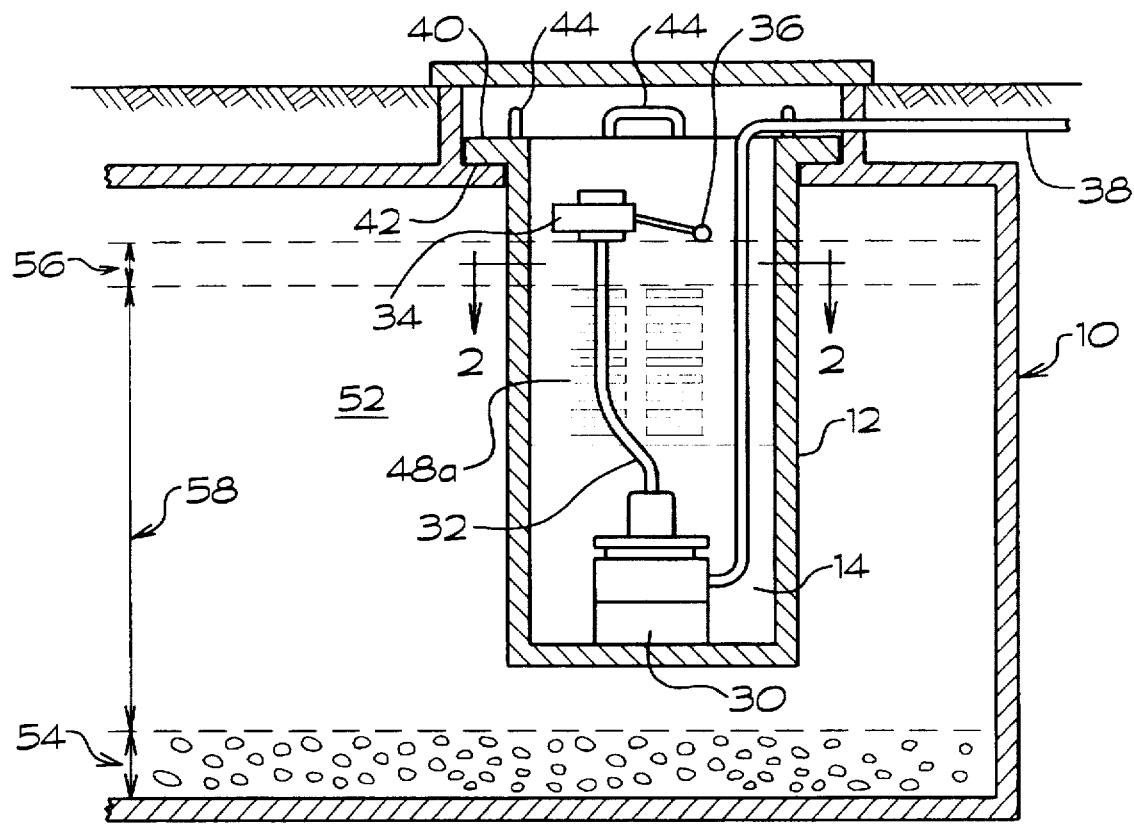
FIG. 1 is a sectional view of one embodiment of the present invention disposed within a septic tank.

Referring to FIG. 1, an open-top, cylindrical filter housing 12 is suspended within a septic tank 10. The housing 12 is provided with a circumferentially extending flange 40 which is mounted onto a circumferentially extending lip 40 of the septic tank. The position of the housing 12 within the septic tank 10 is such that in normal operation, the housing 12 will be partially submerged in waste water 52.

The waste water 52 within the septic tank 10 is generally in three layers. Adjacent the bottom of the septic tank 10 is a layer identified by the numeral 54 comprising a high concentration of solids having a specific gravity greater than that of water. The uppermost layer, identified by the numeral 56, comprises a large concentration of floating solids which have a specific gravity less than that of water. Between the solid layer 54 and 56 is an intermediate layer of relatively clear liquid or water, this layer being identified by the numeral 58. Filter housing 12 is positioned with liquid permeable sidewall filtering sections disposed within the relatively clear layer 58.

Figure 2:
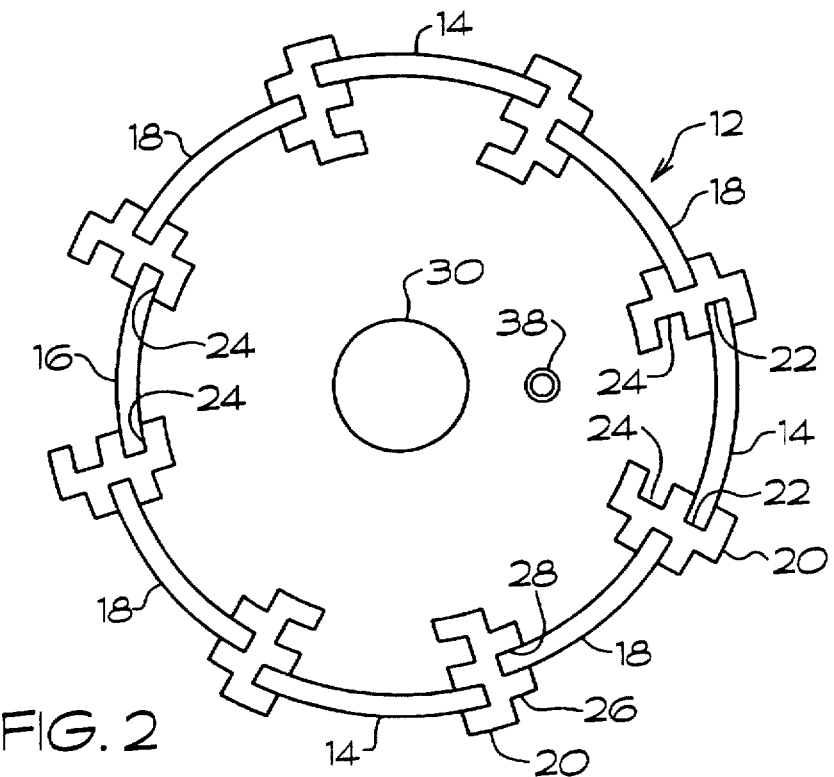
FIG. 2 is an enlarged sectional top view of the embodiment shown in FIG. 1 taken along the line 2—2 of FIG. 1.
Figure 3:
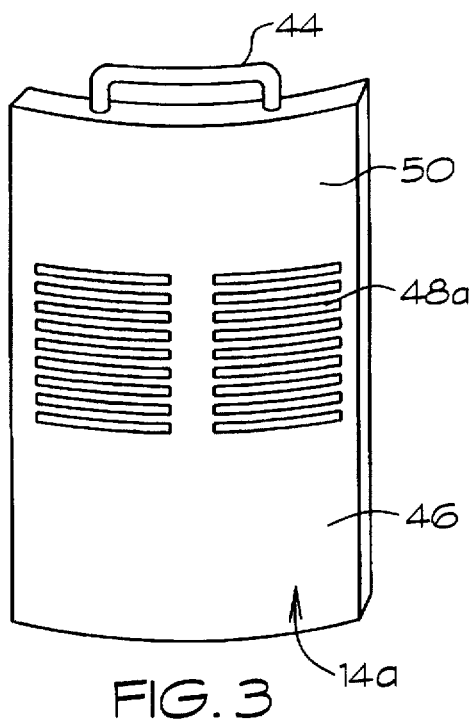
FIG. 3 is a perspective view of one preferred removable fluid permeable sidewall of a housing of the present invention.

As best shown in FIG. 2, the filter housing 12 is made up of a plurality of vertically extending sidewall sections which extend circumferentially around the housing, each one making up a preselected arcuate segment of the cylindrical walls of the housing 12. In one preferred embodiment, the cylindrically housing 12 is made up of alternating fixedly attached vertically extending sidewall members, and removable vertically extending sidewall members. Fixedly attached sidewall members are identified by the numeral 18 and the removable vertically extending sidewall sections are identified by the numerals 14 and 16. Removable vertically extending sidewall sections 14, as best shown in FIG. 3 as sidewall 14a, in FIG. 3A as sidewall 14b and in FIG. 4 as sidewall 14c, are provided with liquid permeable or filtration portions and liquid impermeable portions. Vertically extending sidewall members 16, as shown in FIG. 5, are substantially liquid impermeable.

Figure 6:
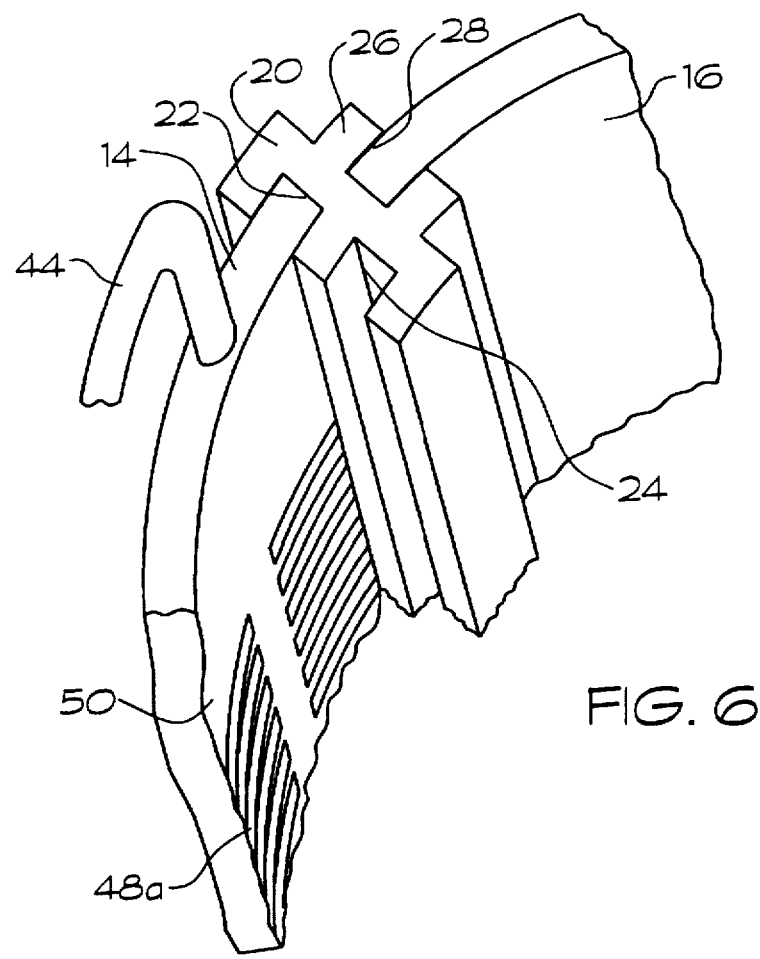
FIG. 6 is an enlarged fragmentary perspective view showing details of connecting means for the removable vertical sidewall sections of FIGS. 3, 4 and 5 in the housing of a preferred embodiment of the present invention.
Figure 7:
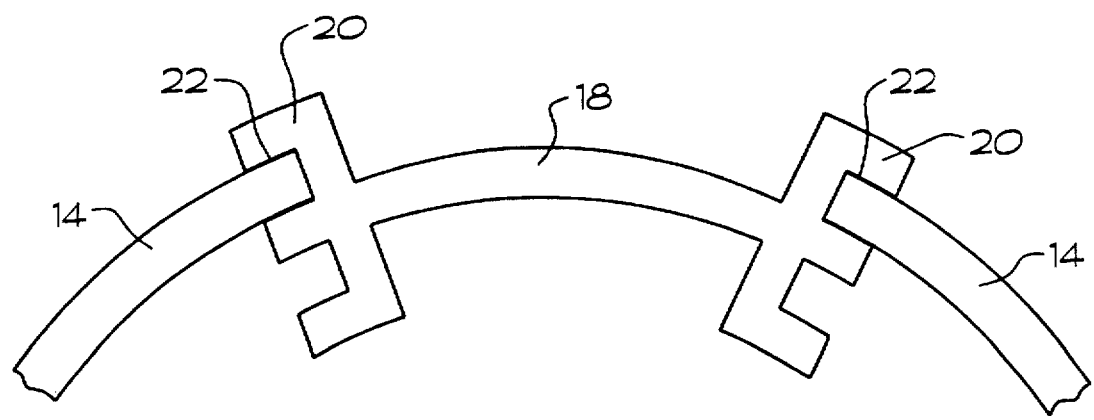
FIG. 7 is an enlarged fragmentary top view of a housing of the present invention showing another preferred connection means for the removable vertical sidewalls for the housing of a preferred embodiment.

As shown in FIGS. 2 and 6, vertically extending E-shaped sidewall connectors 20 are provided with a vertically extending front groove 22 for receiving a vertical edge of a removable sidewall 14 or 16 and a vertically extending parallel back groove 24 for receiving a vertical edge of a second removable sidewall 14 or 16. Grooves 22 and 24 are of a width substantially the same as the thickness of the removable sidewalls 14 and 16 thereby providing for a close or tight fit of the sidewalls 14 and 16 within the grooves 22 and 24. Moreover, as shown in FIG. 2, E-shaped connectors 20 are disposed at spaced facing relationship at preselected positions along the circumference of the housing 12 and the distance between the facing E-shaped connectors are substantially the width of the removable sidewalls 14 or 16. E-shaped connectors 20 may be fixedly attached or removable. Also, as shown in FIG. 2, between the back sides of the E-shaped connector 20 is a liquid impermeable sidewall 18 which is generally non-removable and unitary with the construction of the housing 12. The back side of the E-shaped connector 20, as shown in FIG. 2, includes a C-shaped holder portion 26 with a vertically extending groove 28 therein for receiving the edges of the sidewalls 18. As shown in FIG. 7, the C-shaped holding portion 26 is not necessary and the sidewalls 18 may be integral with two spaced E-shaped connectors 20.

As shown in FIGS. 3, 3A, 4, and 5, the removable sidewalls identified by numerals 14a, 14b, 14c, 16, respectively, are provided with handles 44 thereon for easy removal and replacement within the housing 12.

Figure 4:
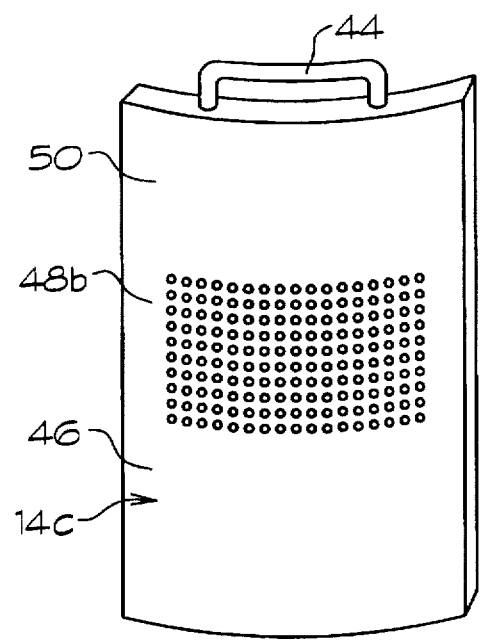
FIG. 4 is a perspective view of even another preferred embodiment of a liquid permeable sidewall of a housing of the present invention.
Figure 5:
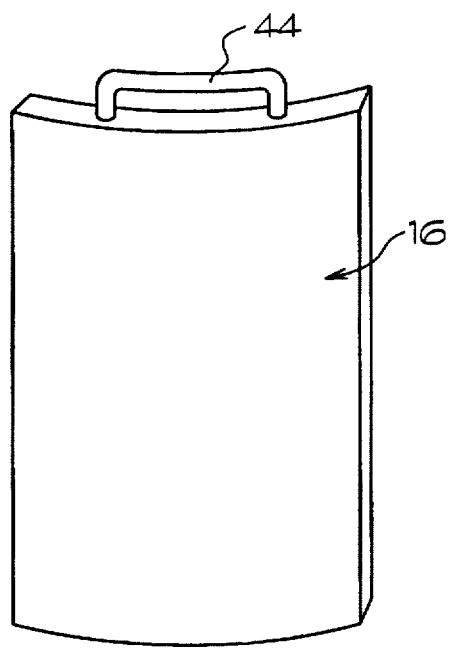
FIG. 5 is a perspective view of a removable fluid impermeable section of a sidewall of the housing of the present invention.
Figure 3A:
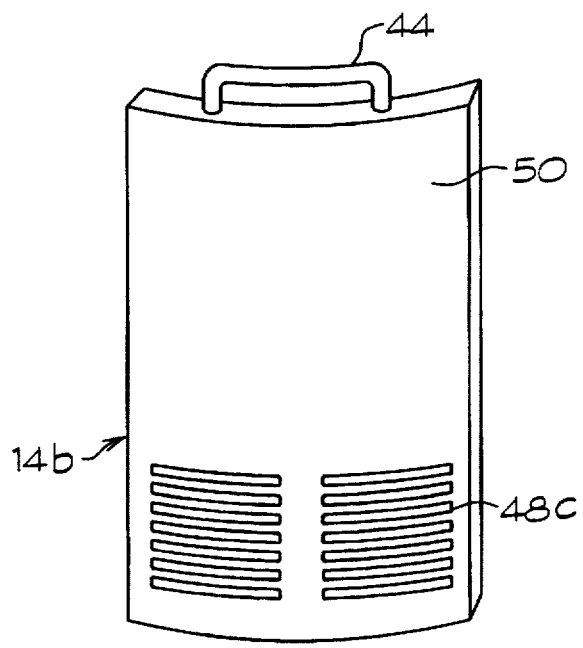
FIG. 3A is a perspective view of another preferred removable fluid permeable sidewall of a housing of the present invention.

As shown in FIGS. 3, 3A and 4, the removable sidewalls 14a, 14b, 14c are provided with first filter or pre-filter means within a preselected vertical portion of the sidewalls. Particularly, in one preferred embodiment as shown in FIG. 3, the sidewall 14a is divided into substantially three equal vertical sections, the lower section being identified by the numeral 46 which is a liquid impermeable section, a middle section identified by the numeral 48a which is the liquid permeable or filtration section, and the upper third section being a liquid impermeable section identified by the numeral 50. As shown in FIG. 3, the liquid permeable section is a plurality of horizontally extending slots having a relatively narrow height generally being from about $\frac{1}{64}$" to $\frac{1}{4}$" and preferably about $\frac{1}{32}$" for the allowing of clear waste water to pass therethrough and particulate material having a diameter greater than $\frac{1}{32}$" separated from the liquid passing through the slots 48a. In FIG. 3A, the liquid impermeable section identified by numeral 50 makes up approximately the upper two-third or more of the sidewall 14a and the liquid permeable section 48c shown as elongated rectangular slots makes up the bottom third or less and is preferably approximately 6" in height. In FIG. 4, a fine mesh screen portion 48b is provided and the mesh of the screen is such that particles having one size dimension greater than $\frac{1}{32}$" will not pass through.

As shown in FIGS. 1 and 2, a positive pressure pump 30 is provided to remove the filtered waste water from the interior of the housing 12 to a drain field outside the confines of the septic tank 10. The positive pressure pump 30 is operated in response to a level control device 34 which includes a vertically movable float 36 thereon which may be any well-known commercially available level control device and float. The level control device 34 is in electrical communication with the pump 30 through electrical conduit 32 which actuates the pump 30 in response to the location of the float 36. The pump 30 is also provided with a discharge conduit 38 which provides the means for directing the waste water from the housing 12 into a specific location in a drain field or out through other provided laterals.

In the operation of the preferred embodiments of FIGS. 1–7, a plurality of liquid permeable removable sidewalls 14 are installed circumferentially at selected locations around the housing 12. As the waste water continues to rise, the float 36 being disposed on the top thereof also rises. At a preselected level of float 36, the level control device 34 actuates the pump 30 thereby draining down the waste water to a preselected level determined by a new lower level of the float 36 at which time the electrical level controller 34 deactivates the pump 30. After a number of operations of filtration, solid material will plug the openings in the liquid permeable sections of the sidewalls 14 thereby decreasing the efficiency of the operation of the filter device. With the liquid permeable portion of a sidewall 14 being plugged the operator may then insert a liquid impermeable sidewall 16 or another liquid permeable sidewall 14 into one of the pairs of grooves 24 of the E-shaped connector 20. As shown in FIG. 2, the liquid permeable removable sidewalls 14 are received within the front grooves 22 and fluid impermeable removable sidewalls 16 are received within the back grooves 24. Once the removable sidewall 16 has been inserted in place, the removable sidewall 14 which is spaced parallel to the removable sidewall 16, may then be removed and cleaned without interfering with the operation of the unit which includes a number of other liquid permeable sidewalls 14 still in place as shown in FIG. 2. Once the removable sidewall 14 has been cleaned, it may then be reinserted into the appropriate section of the housing 12 and the removable sidewall parallel thereto and spaced from the recently inserted sidewall 14 removed.

Preferably, the housing 12 and all of the sidewalls 14, 16 and 18 as well as the E-shaped connectors are made of suitable molded plastic materials, one preferred plastic material being a molded polypropylene, polyethylene, or the like.

Figure 8:
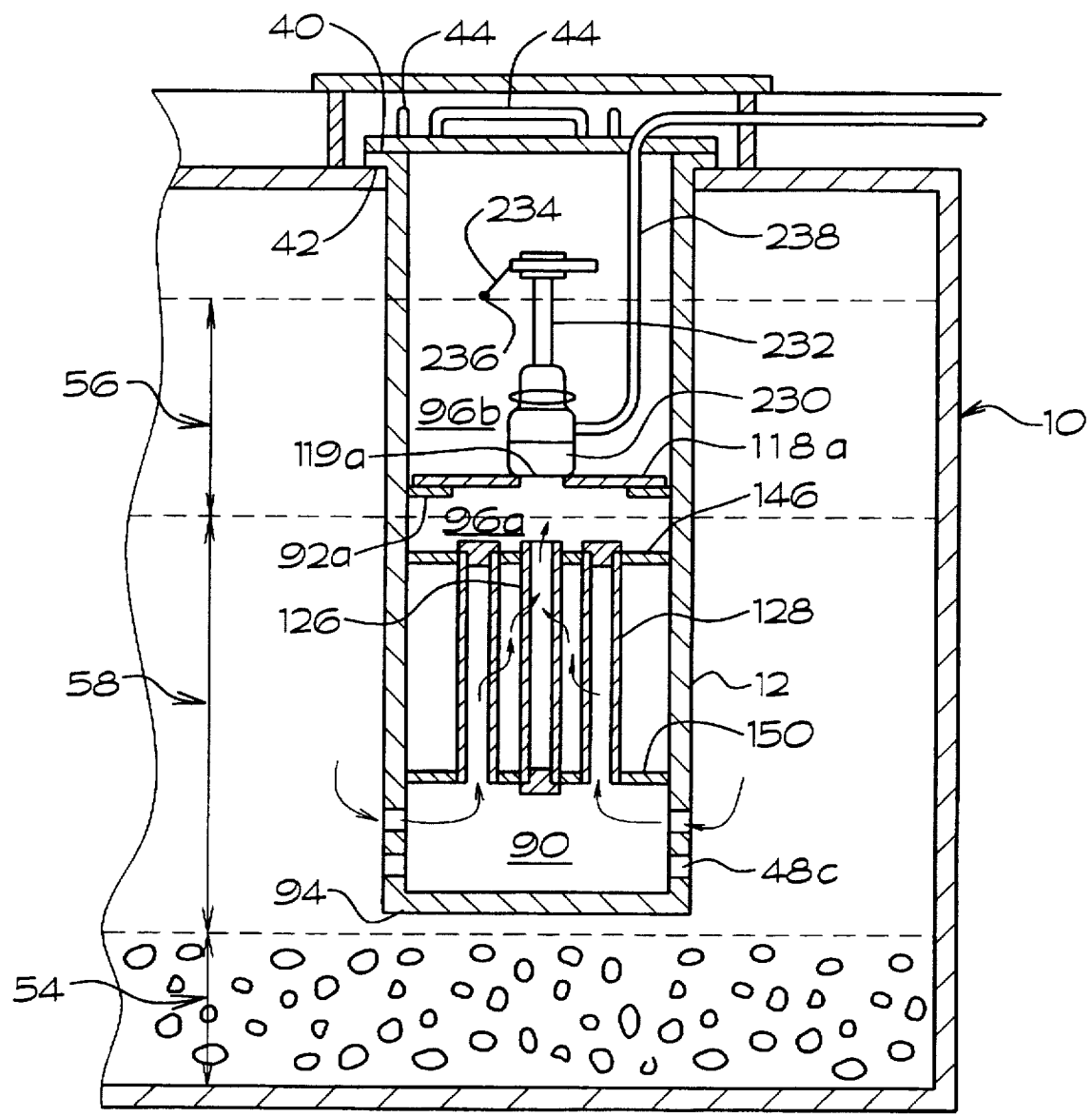
FIG. 8 is a sectional view of another embodiment of the present invention disposed within a septic tank.
Figure 9:
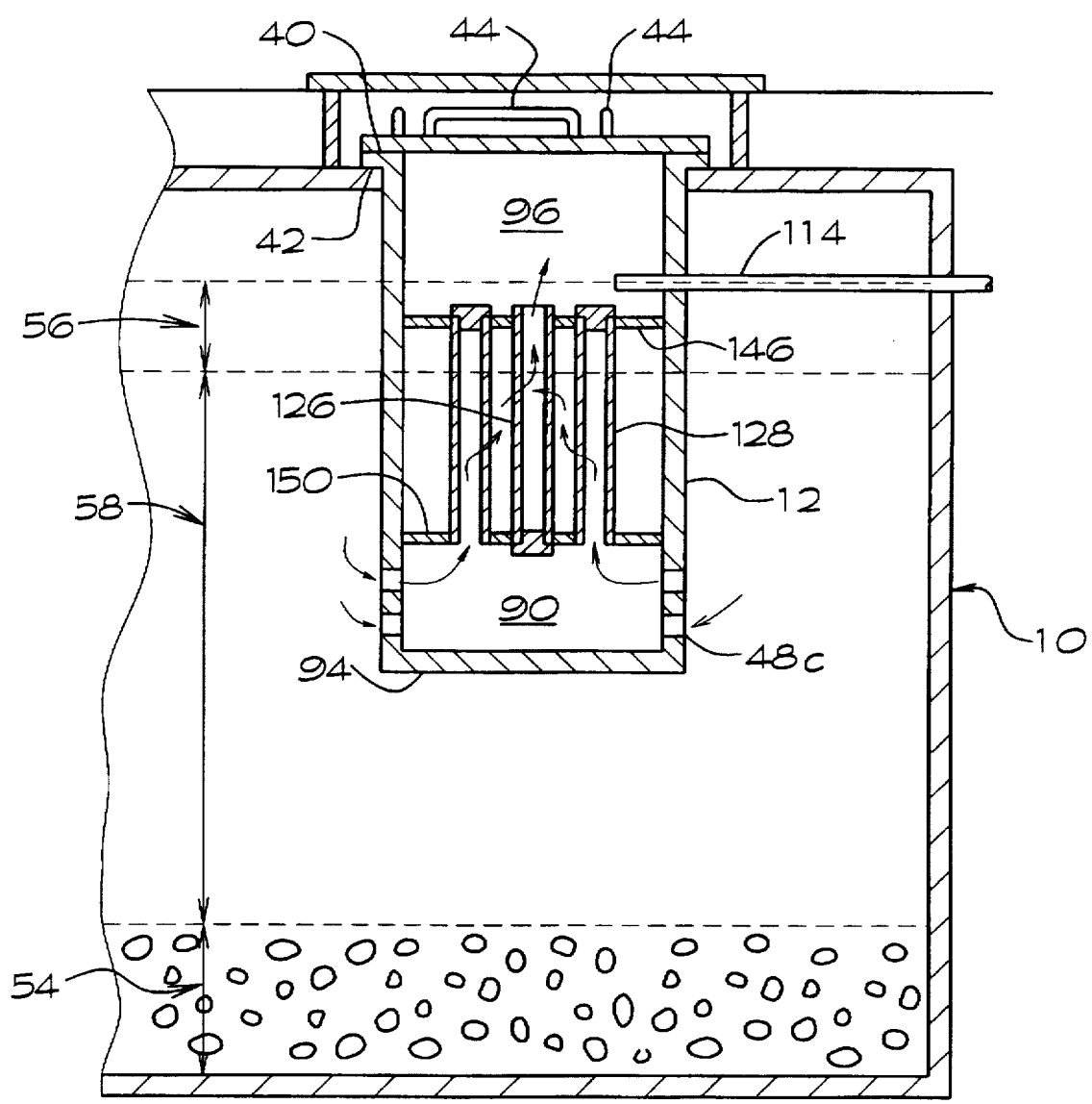
FIG. 9 is a sectional view of even another embodiment of the present invention disposed within a septic tank.

FIGS. 8 and 9 show the embodiments of a multi-stage filter system of the present invention. As shown, an open top, cylindrical filter housing 12 is suspended within a septic tank 10. The housing 12 is provided with a circumferentially extending flange 40 which is mounted onto a circumferentially extending lip 42 of the septic tank. The position of the housing 12 within the septic tank is such that in normal operation, the housing will be at least partially submerged in relatively clear waste water 58 in the same manner as shown in FIG. 1. The filter housing 12 in FIGS. 8 and 9 is shown and described in FIGS. 2–7. Preferably, the vertically extending sidewall section 14b shown and described in FIG. 3A is used in the embodiment in FIGS. 8 and 9, wherein the flow-through slots and the liquid permeable section 48c are disposed in the lower portion of the sidewall and generally extend upwards only about 6" so that all of the flow of liquid into the housing 12 is through the lower portion of the housing and into the inlet filtering chamber 90 which is defined between bottom cylindrical disc 150 and the bottom end 94 of the filter housing 12. The disc 150 is provided with a plurality of openings to receive the bottom end of a plurality of filter tubes 128 therein. As shown in FIG. 8, a first upper cylindrical disc 146 is provided with a plurality of openings therein to receive the upper ends of the first filter tubes 128 and a second centrally disposed filter tube 126 which is in flow communication with the first filter tubes 128. A second upper cylindrical disc 118a is provided with an opening 119a therein which provides for flow-through communication between a first discharge chamber 96a defined by the discs 146 and 118a and a second discharge chamber 96b. Inwardly extending fingers 92a are provided to support the disc 118a thereon. As shown, the positive pressure pump 230 is provided to remove the filtered waste water from the outer discharge chambers 96a and 96b to a drain fill outside the confines of the septic tank 10. The positive pressure pump 230 is mounted atop the disc 118a in the second discharge chamber 96b. The positive pressure pump 230 is operated in response to a level control device 234 which includes a vertically removable float 236 thereon which may be any well-known commercially available level control device and float. The level control device 234 is in electrical communication with the pump 230 through electrical conduit 232 which actuates the pump 230 in response to the location of the float 236. The pump 230 is also provided with a discharge conduit outlet 238 which provides the means for directing the waste water from the outlet discharge chambers 96a and 96b into a specific location in a drain fill or out through other provided laterals.

As shown in FIG. 9, a plurality of first filtering tubes 128 and a centrally disposed second filtering tube 126 are positioned within the filtering apparatus 12 in flow communication with upper discharge chamber 96 and in turn horizontally extending discharge outlet 114 so that the filtered liquid is removed from the filtered liquid receiving chamber 96 by gravity.

As shown in FIGS. 10–22 and described hereinafter are the preferred interior filtering arrangement for the multistage filter system shown in FIGS. 8 and 9.

Figure 10:
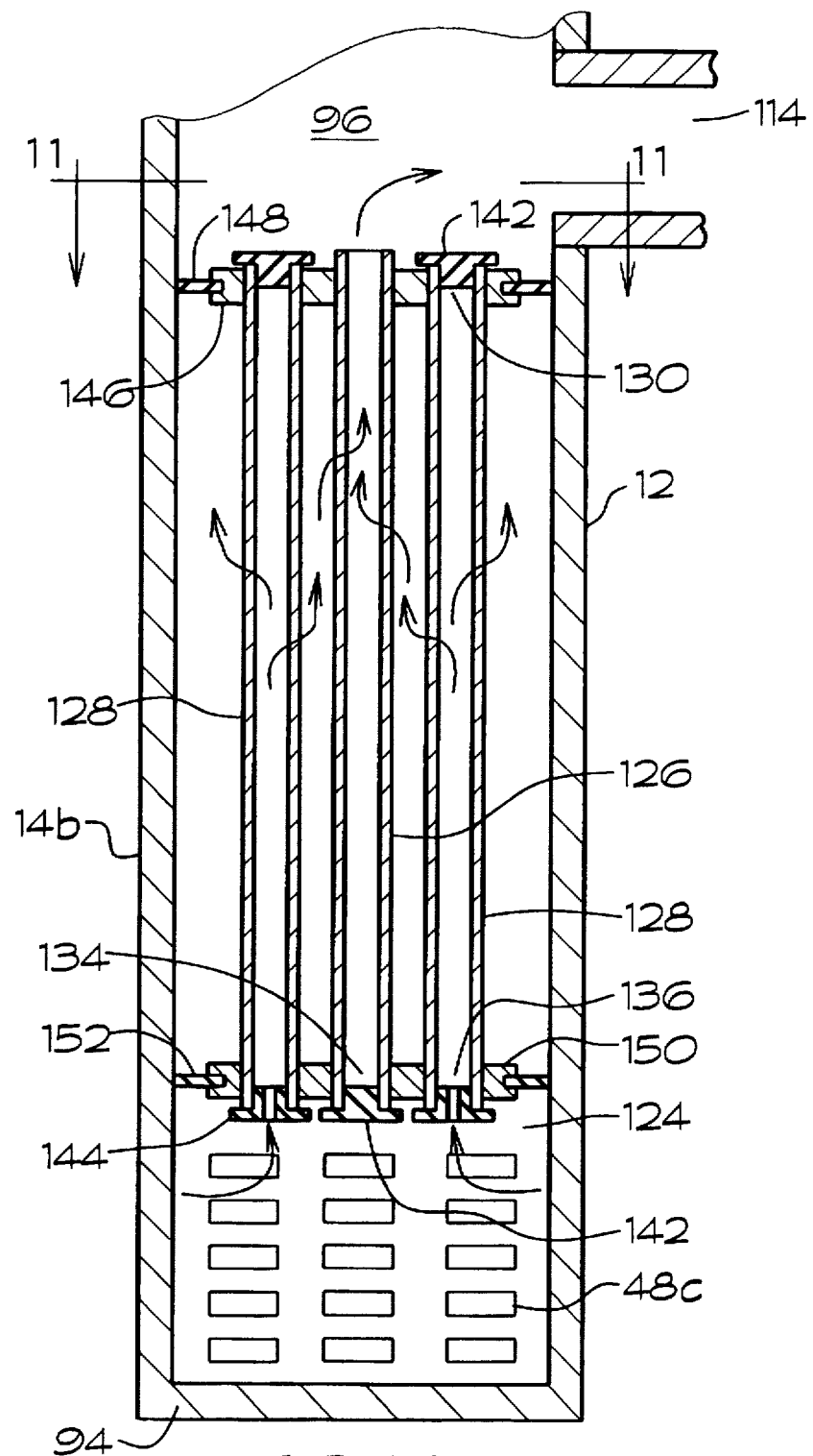
FIG. 10 is an enlarged sectional view of one preferred filter of the present invention with selected portions cutaway.
Figure 11:
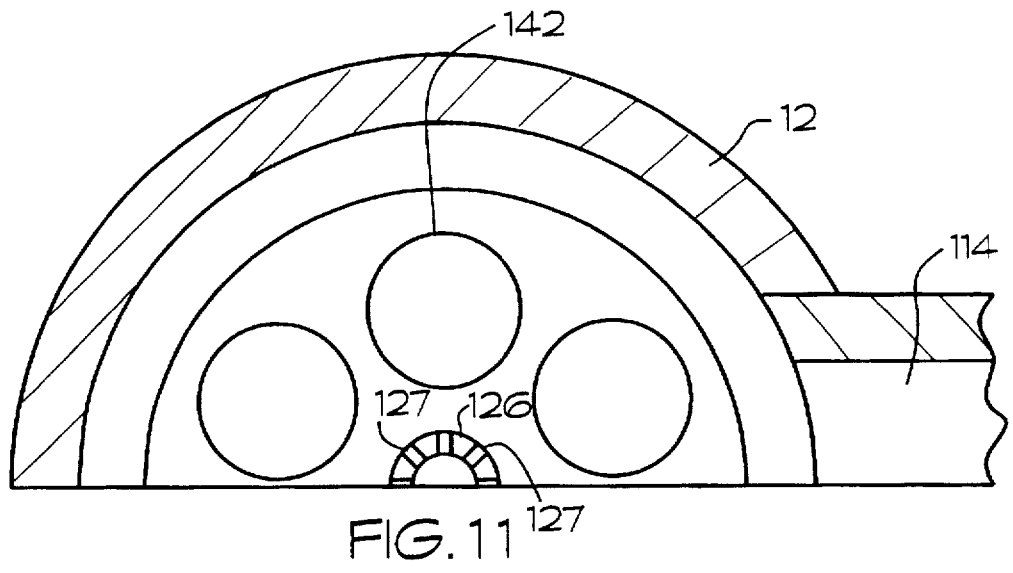
FIG. 11 is a fragmentary enlarged sectional top view of the embodiment shown in FIG. 10 taken along line 11—11.

As best shown in FIG. 10, the filter housing 12 of the present invention includes a plurality of first filter tubes 128 therein which extend vertically in spaced parallel relation from the bottom portion 124 of housing 12 toward the outlet discharge chamber 96 of the filter housing 12. The plurality of longitudinally extending filter tubes 128 are spaced from and circumscribe a centrally disposed second filter tube 126 which is also longitudinally extending from the bottom 124 of the housing 12 towards the top chamber 96. Each of the filter tubes 128 is provided with flow-through openings 140 (FIG. 12) in the vertically extending walls and the centrally disposed filtering tube 126 is also provided with a plurality of flow-through openings 127 of preselected cross section distributed along the length of the filter tube 126. As shown in FIG. 10, flow-through opening 136 in the filter tube 128 is provided with an open plug 144 having a flow-through opening 145 therein (FIG. 14) and the opposed opening 130 receives a plug 142 (FIG. 13) to seal off the upper end of the tube 128. The centrally disposed filter tube 126 is provided with a plug 142 in bottom end 134 thereto to close off the flow of fluid into the bottom end of the filter tube 126 and the upper end is left open.

As also shown in FIG. 10, the horizontally extending bottom plate member or disc 150 is provided with a flexible gasket material 152 spaced between the outer periphery of the disc 150 and the inner walls of the housing 12 thereby providing a seal between the disc 150 and the inner wall of the housing 12. Disc 150 is provided with openings therein to receive the bottom ends 136 of tubes 128. Thus, the only flow of liquid into the housing 12 is through the opening 142 in the plug 144 in each of the filter tubes 128. It is realized, however, that openings 136 may not include plug 144, but may be left open, if desired. In the top portion of the housing 12, but vertically below the outlet 114, is the horizontally extending top plate member or disc 146 which is also provided with a flexible gasket or sealing member 148 which is disposed between the disc 146 and the inner wall of the housing 12 to prevent the flow of waste water out of the housing except through the open upper end of the centrally disposed filter tube 126 which is in fluid communication with outlet discharge chamber 96.

Figure 12:
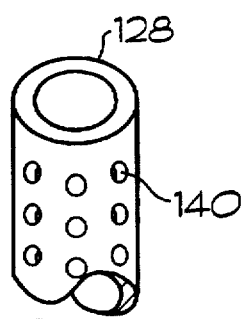
FIG. 12 is a perspective view of one preferred first filter tube of the present invention.
Figure 12A:
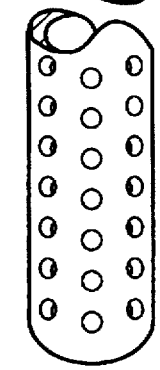
FIG. 12A is a perspective view of one preferred second filter tube of the present invention.
Figure 13:
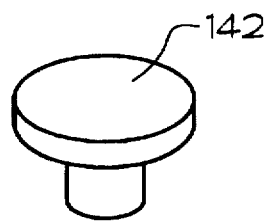
FIG. 13 is an enlarged perspective view of one closed plug insertion in one end of the filter tubes of FIGS. 12 and 12A.
Figure 14:
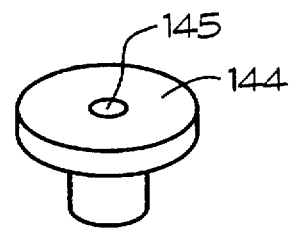
FIG. 14 is an enlarged perspective view of one open plug for insertion into one end of the filter tubes of FIGS. 12 and 12A.

As shown in FIG. 10, the filter tubes 126 and 128 are shown as being of approximately the same diameter. However, it is realized that in practice the centrally disposed tube 126 may be the same size as each of the filter tubes 128 or in many cases, may be larger as the centrally disposed filter tube has to receive all of the waste water that is flowing upwardly through a plurality of filter tubes 128. Moreover, the openings 127 in the filter tube 126 are generally smaller in cross section than the openings in the filter tubes 128 so as to provide for dual filtration of the effluent as it moves upward through the filter housing 12. In one preferred embodiment, for example, the flow-through openings 140 in tube 128 (FIG. 12) will be approximately ⅛" in diameter whereas the flow-through openings 127 (FIG. 12A) in the filter tube 126 will be approximately ³⁄₃₂" in diameter. However, the filter tube 126 may have a substantially greater number of flow-through openings 127 than the number of flow-through openings 140 in the filter tubes 128 thereby providing substantially greater overall flow-through cross-sectional area of flow in the tube 126 than the tubes 128.

Figure 15:
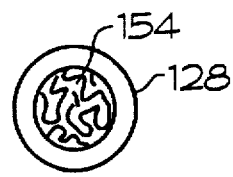
FIG. 15 is a top view of one filter tube of FIG. 12 showing additional filtering media therein.

As shown in FIG. 15, in order to even further improve the filtration efficiency of the present filter apparatus, fibrous filtering material 154 may be placed within the filter tube 128 wherein the fibrous filter material will even filter out those particles which would pass through an ⅛" opening, such as opening 140.

Figure 16:
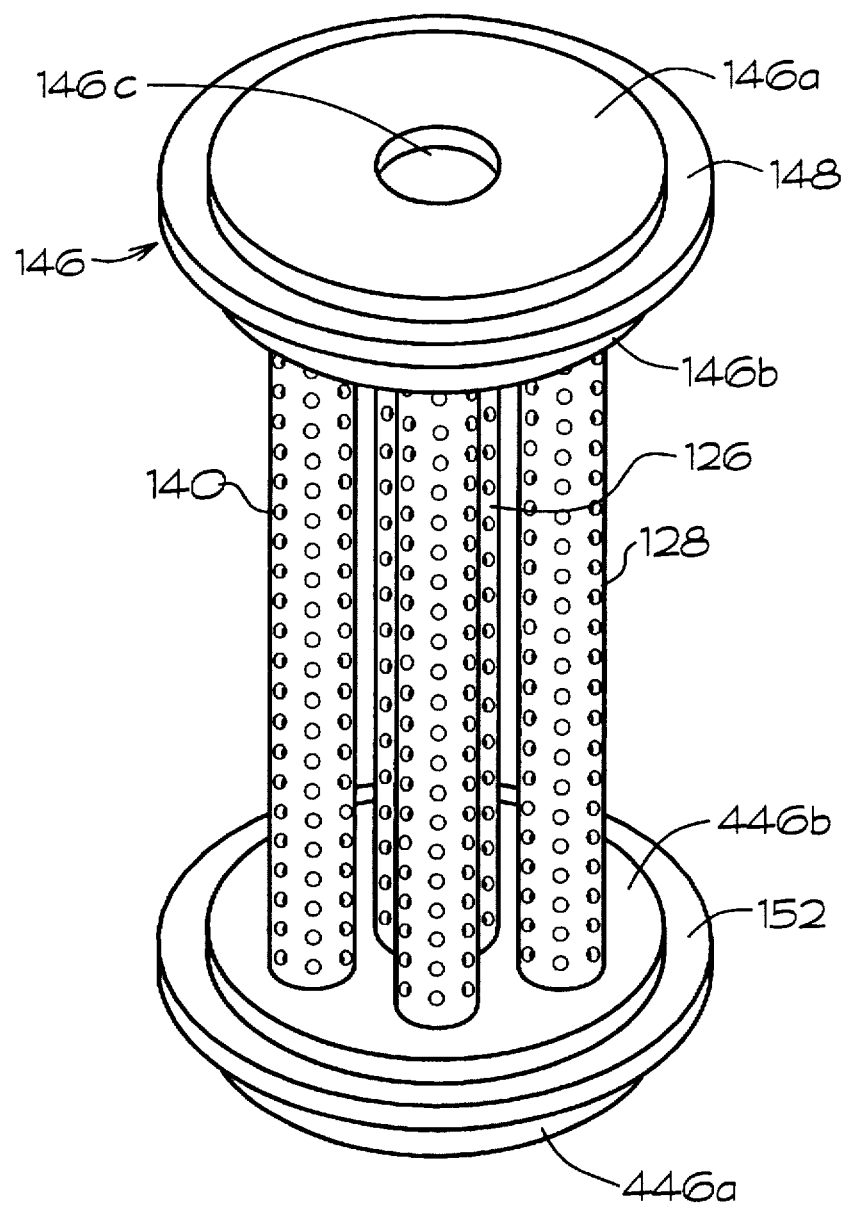
FIG. 16 is a perspective view of the filtering cartridges of a preferred embodiment including the filter tubes of FIG. 12 and FIG. 12A.
Figure 17:
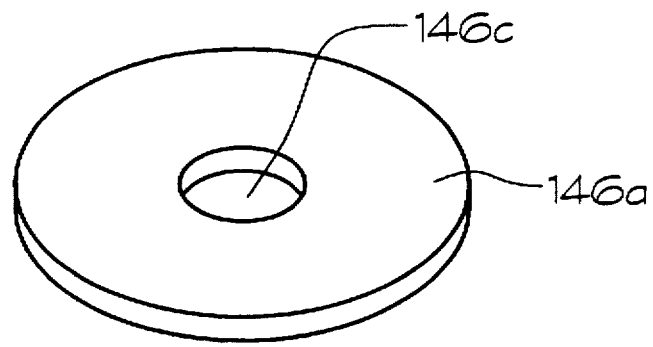
FIG. 17 is a perspective view of one element of the preferred embodiment of FIG. 16.
Figure 18:
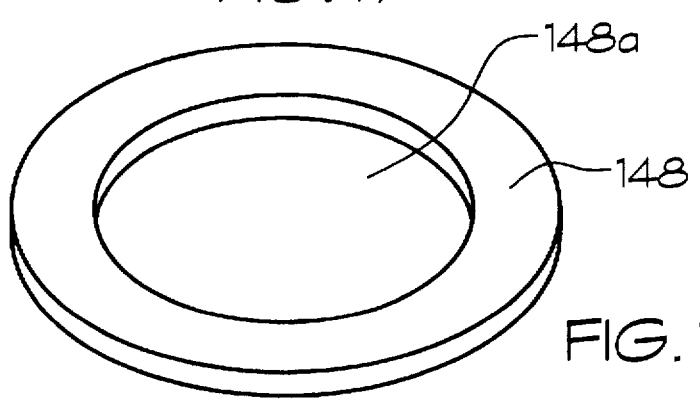
FIG. 18 is a perspective view of another element of FIG. 16.
Figure 19:
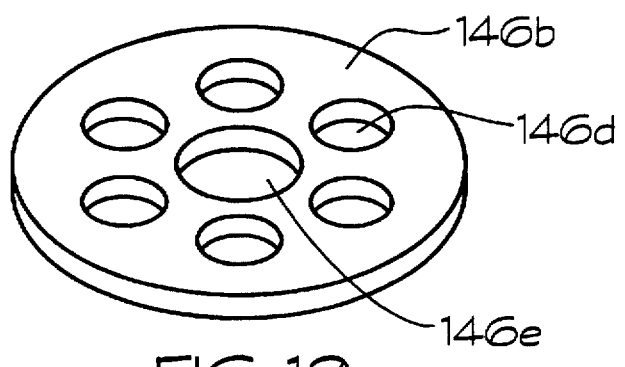
FIG. 19 is a perspective view of even another element shown in FIG. 16.
Figure 20:
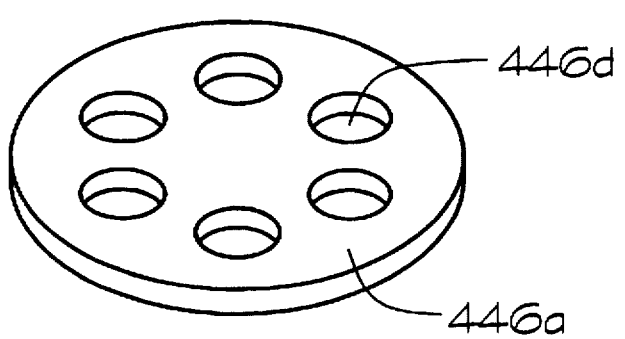
FIG. 20 is a perspective view of even another element shown in FIG. 16.

Referring now to FIG. 16, FIG. 16 shows a preferred arrangement of the filter elements of the present invention wherein the top plate member 146 is provided in two sections, an upper top tube receiving plate section 146a and a lower top tube receiving plate section 146b. Sandwiched between the plate sections 146a and 146b is an O-ring or gasket 148 (FIG. 18) having an opening 148a therethrough. The upper tube receiving plate section 146a is provided with an opening 146c (FIG. 17) for receiving the filter tube 126 therethrough. The lower top tube receiving plate section 146b is provided with a plurality of openings 146b (FIG. 19) for receiving the filter tubes 128 therethrough and a central opening 146e (FIG. 19) for receiving the filter tube 126 therethrough. The lower portion of the filter elements 126 and 128 are received by the bottom tube receiving plate member which is in two sections identifiable as the upper bottom tube receiving plate section 446b and the lower bottom tube receiving plate section 446a with an "O-ring" or gasket 152 being sandwiched therebetween, gasket 152 acting as a seal between the two element plate sections 446a, 446b, and the inner periphery of the housing 118. The upper bottom tube receiving plate section 446b is identical to the lower top tube receiving plate section or disc 446b. The lower bottom tube receiving plate section 446a is provided with openings 446d (FIG. 20) for receiving filter tubes 128 therethrough, but closed to the opening in the lower end of tube 126. Gasket 152 is also identical with and interchangeable with the gasket 148. The complete arrangement as shown in FIG. 16 including all of the elements contained in the housing 12 are easily removable for cleaning and replacing.

In operation of the system shown in FIGS. 8–20, waste water flows through the first filter openings 48c into the inlet filter chamber 90, and, in turn into the bottom openings 136 in the filter tubes 128 then upwards therethrough and out of the tubes 128 through the openings 140 and into the interior of the housing 12. The waste water in the housing 12 then continues its upward flow and through openings 127 in the centrally disposed filter tube 126 into the interior of the tube 126. Waste water continues passing upwardly beyond the disc 146 and then out through the upper end of the tube 126 into the outlet discharge chamber 96 or 96a. The waste water is then pumped out of the housing 12 by pump 230 or flows by gravity out through the discharge outlet 114.

It is realized that various modifications may be made to the aforedescribed embodiments of the present invention without departing from the scope and spirit intended. Therefore, such modifications are intended to be included and incorporated within the claims appended hereto.

What is claimed is:

1. A multi-stage filter system for separating solid material from a liquid comprising:

a first filter device comprising a housing having a top with an opening therein, a closed bottom, and a plurality of vertically extending sidewall sections, at least one of the said sidewall sections including means to receive a pair of spaced, parallel removable vertically extending sidewall members, at least one of said removable vertical extending sidewalls including filter means to retain solids of preselected size from a liquid, and, an inwardly extending circumferential bottom seal extending around an inner surface of said housing at a preselected distance above said filter means, said seal and said closed bottom defining a prefiltered liquid inlet chamber;

a second filter device having a horizontally extending bottom cylindrical disc with a plurality of openings therethrough in sealing relation with said bottom seal, a horizontally extending top cylindrical disc with a second filter tube receiving opening therethrough, said top disc being in sealing relation with said housing, a plurality of first vertically extending filter tubes having an opening in a bottom end of each of said first filter tubes and a closed top, each bottom end being in flow communication with an opening in said bottom cylindrical disc, a second vertically extending filter tube spaced from said first filter tubes, said second filter tube having an open top in its upper end and a closed bottom, the upper end being received by said second filter tube receiving opening; and, means to remove filtered liquid from said housing in a flow communication with said second filter tube open top.

2. The filter system of claim 1, said pair of removable vertically extending sidewall sections being circumferentially aligned with a front sidewall and a back sidewall wherein in a filtering condition one of said sidewalls being liquid permeable, and in a cleaning operation the other of said sidewalls being liquid impermeable.

3. The filter system of claim 1, said sidewall sections being liquid permeable including a plurality of horizontally extending slots.

4. The filter system of claim 3, said horizontally extending slots being from about 1/64" to 1/4" inches in height.

5. The filter system of claim 1, said at least one of said removable vertically extending sidewall having a lower vertical liquid permeable section.

6. The filter system of claim 5, said lower permeable section being less than one-third of the vertical height of said sidewall.

7. The filter system of claim 6, said vertical height being approximately 6".

8. The filter system of claim 1, only one sidewall member being received within said means to receive a pair of spaced, parallel removable vertically extending sidewall members.

9. The filter system of claim 1, including pump means to remove liquid from said housing.

10. The filter system of claim 9, said pump means being mounted above said first and said second vertically extending filter tubes.

11. The filter system of claim 1, said first filter tubes spaced circumferentially of said second filter tube.

12. The filter system of claim 1, said first filter tubes having flow-through openings in the walls along the length of said first filter tubes.

13. The filter system of claim 1, said bottom end opening in said first filter tubes being centrally disposed.

14. The filter system of claim 1, said first filter tubes having flow-through openings along the length of said first tubes, said second filter tube having flow-through openings along the length of said second tube, each flow-through opening in said first filter tubes being of preselected cross-sectional area greater than the cross sectional area of each opening along the length of the second filter tube.

15. The filter system of claim 1 including fibrous packaging filtering material disposed within the interior of said first filter tubes.

16. The filter of claim 1, said horizontally extending top disc comprising an upper top tube receiving plate section and a lower top tube receiving plate section, said upper top plate section being vertically above said lower top plate section, said upper top plate section having an opening therein to receive said second vertically extending filter tube, said lower plate section having openings therein to receive said first vertically extending tubes and said second vertically extending filter tube.

* * * * *